(12) United States Patent
Patel et al.

(10) Patent No.: US 10,810,046 B2
(45) Date of Patent: Oct. 20, 2020

(54) AUTOMATED SYSTEM FOR OPTIMIZING BATCH PROCESSING TIME

(71) Applicant: Tata Consultancy Services Limited, Mumbai (IN)

(72) Inventors: Alok Patel, Pune (IN); Veerendra Kumar Rai, Pune (IN); Abhinay Puvvala, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 136 days.

(21) Appl. No.: 16/103,508

(22) Filed: Aug. 14, 2018

(65) Prior Publication Data

US 2019/0050262 A1    Feb. 14, 2019

(30) Foreign Application Priority Data

Aug. 14, 2017   (IN) .............................. 201721028920

(51) Int. Cl.
| | |
|---|---|
| *G06F 9/50* | (2006.01) |
| *G06F 9/48* | (2006.01) |
| *G06F 9/46* | (2006.01) |
| *H04L 12/24* | (2006.01) |

(52) U.S. Cl.
CPC .............. *G06F 9/5038* (2013.01); *G06F 9/46* (2013.01); *G06F 9/466* (2013.01); *G06F 9/48* (2013.01); *G06F 9/485* (2013.01); *G06F 9/4843* (2013.01); *G06F 9/4881* (2013.01); *G06F 9/4887* (2013.01); *G06F 9/50* (2013.01); *G06F 9/5005* (2013.01); *G06F 9/5027* (2013.01); *H04L 41/50* (2013.01); *H04L 41/5019* (2013.01); *H04L 41/5009* (2013.01); *H04L 41/5058* (2013.01)

(58) Field of Classification Search
CPC ..... G06F 9/48; G06F 9/50; G06F 9/46; G06F 9/466; G06F 9/4843; G06F 9/485; G06F 9/4881; G06F 9/5005; G06F 9/5027; G06F 5/5038; H04L 41/50; H04L 41/5009; H04L 41/5019
See application file for complete search history.

(56) References Cited

U.S. PATENT DOCUMENTS

| | | |
|---|---|---|
| 6,701,342 B1 | 3/2004 | Bartz et al. |
| 7,668,741 B2 | 2/2010 | Ernest et al. |
| 7,725,570 B1 | 5/2010 | Lewis |
| 10,509,739 B1 * | 12/2019 | Gudipati .............. G06F 9/5038 |

(Continued)

*Primary Examiner* — Charles M Swift
(74) *Attorney, Agent, or Firm* — Finnegan, Henderson, Farabow, Garrett & Dunner LLP

(57) ABSTRACT

A method and system is disclosed herein for optimizing batch processing time required for executing one or more batch jobs received in real time, while adhering to service level agreements (SLAs) compliance in one batch job arrangement of an information technology service management (ITSM). A batch job system is characterized by the set of jobs and dependencies between jobs. Each job is in turn characterized by run-time, from-time and SLA definitions. SLAs can be of two kinds Start-time and End-time. Start-time SLA requires that the job execution starts before the specified time while End-time SLA necessitates that the job finishes its execution before the specified time. To optimize processing time required for executing one or more batch jobs the disclosure identifies SLA violations and solves them to produce a set of actionable levers.

11 Claims, 4 Drawing Sheets

(56) References Cited

U.S. PATENT DOCUMENTS

| | | | |
|---|---|---|---|
| 2008/0288948 A1* | 11/2008 | Attarde | G06F 3/0613 718/103 |
| 2010/0313203 A1* | 12/2010 | Dawson | G06F 1/3203 718/102 |
| 2010/0318859 A1* | 12/2010 | Augusto | G06F 11/0715 714/57 |
| 2011/0138397 A1* | 6/2011 | Kikuchi | G06F 11/3476 718/106 |
| 2012/0180055 A1* | 7/2012 | Brech | G06F 9/4893 718/102 |
| 2015/0033233 A1* | 1/2015 | Hosokawa | G06F 9/4887 718/102 |
| 2016/0253208 A1* | 9/2016 | Kumar | G06F 9/4881 717/102 |
| 2019/0052547 A1* | 2/2019 | Patel | G06F 11/3466 |

* cited by examiner

US 10,810,046 B2

AUTOMATED SYSTEM FOR OPTIMIZING BATCH PROCESSING TIME

PRIORITY CLAIM

This U.S. patent application claims priority under 35 U.S.C. § 119 to India Application No. 201721028920, filed on Aug. 14, 2017. The entire contents of the abovementioned application are incorporated herein by reference.

TECHNICAL FIELD

The present subject matter described herein, in general, relates to systems and methods for optimizing batch processing time, and more particularly systems and methods for optimizing batch processing time while adhering to SLA compliance requirements in real time.

BACKGROUND

In modern day organizations, the underlying IT for most business processes has to be tuned to perform high volume, repetitive tasks/jobs that require little to no manual intervention. While online systems can potentially handle such requirements, they are not typically optimized and may hence prove costly. Besides, most of these tasks/jobs need not be handled in real time. As a result, Batch systems have become ubiquitous in the enterprise IT of every organization. Clearly, the name, batch systems, comes from the mode of processing execution of jobs (batch) in a sequence. Data integration, compliance checks, analytics, reporting, billing and image processing jobs are some examples of Batch applications.

Typically, a batch job is characterized by a set of jobs and dependencies between the jobs. Each job is in turn characterized by run-time, from-time and SLA definitions. The run-time of each job is the time taken to process the workload. The from-time attribute mandates that the job can only start after the stated time. The SLAs can be of two kinds as start-time and end-time. The start-time requires that the job execution starts before the specified time while the end-time SLA necessitates that the job finishes its execution before the specified time. The challenge in a batch job is to reduce the total batch processing time while adhering to SLA compliance requirements.

Another vital aspect of batch systems is Service Level Agreements (SLAs). The SLAs are defined by temporally measuring the start and end of business critical jobs and processes. To fulfill the business requirement, SLAs are defined for each batch process separately. However, spikes in workload, inadequately provisioned computational capacity along with many other reasons often lead to SLA violations. The onus is on the system administrators to handle such scenarios and ensure that SLA violations are minimized. To do so, it is essential to not only predict potential SLA violations but also to identify the right set of levers that can be used to reduce the total batch processing time and satisfies SLA requirements.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for optimizing batch processing time required for executing one or more batch jobs received in real time.

In one aspect, a system for optimizing batch processing time required for executing one or more batch jobs received in real time, while adhering to service level agreement (SLA) compliance in one batch job arrangement of an information technology service management (ITSM). The system comprising a memory and a processor communicatively coupled with memory. Further, the system comprises a data collection module, a data management module, a processing module, a generation module, a computing module, an optimization module and a reconfiguration module. The data collection module receives one or more data sets such as jobs and dependency data tables, transactional history, batch schedule and SLA definitions from one or more sources. The data management module filters the collected data sets to ensure data consistency, completeness and uniformity. The processing module is configured to create a profile and predecessor list of each job using the filtered data of data management module. The generation module takes these filtered data sets to build a dependency graph and identify all rootnodes. Further, the computing module of the system uses transactional history to derive from-time constraints for these rootnodes and identifies at least one job that is likely to be SLA non-compliant by computing reach-time for the job using dependency graph and other job details.

Further wherein, the system compares reach-times and run-times of the identified at least one job of the one or more jobs with SLA definitions (start-time SLA and end-time SLA) to identify potential SLA violations and also with minimum batch job system perturbations. Once it identifies these SLA non-compliant jobs, the module finds the optimal set of levers to minimize SLA non-compliances and to optimize batch processing time required for executing one or more batch jobs.

Further, the optimization module identifies the one or more jobs that can be postponed to another batch and executes batch jobs partially by reducing the workload or running the job on multiple cores simultaneously. In addition to this, the optimization module identifies the dependencies that can be relaxed or identifies those jobs, whose from-time constraint can be relaxed. Once the system identifies all levers, it re-configures the batch job system's run to optimize processing time by updating the job and dependency tables using the reconfiguration module. Furthermore, a reconfiguration module converts the obtained optimal solutions of the model to actionable levers.

In yet another aspect, a method for optimizing batch processing time required for executing one or more batch jobs received in real time, while adhering to service level agreement (SLA) compliance in one batch job arrangement of an information technology service management (ITSM). The method comprising one or more steps such as receiving one or more data sets such as jobs and dependency data tables, transactional history, batch schedule and SLA definitions from one or more sources at a data collection module of a system. Using a data management module to filter the collected data sets to ensure data consistency, completeness and uniformity. The filtered data sets are used to build a dependency graph and to identify all root-nodes of each job. Further, in the next step it derives from-time constraints for these root-nodes and transactional history and then it identifies at least one job that is likely to be SLA non-compliant by computing reach-time for each job using dependency graph and other job details.

Further wherein, in the next step, comparing reach-times and run-times of the identified at least one job of the one or more jobs with SLA definitions (start-time SLA and end-time SLA) to identify potential SLA violations and also with minimum batch job system perturbations. Once it identifies these SLA non-compliant jobs, a set of levers is identified to minimize SLA non-compliances and to optimize batch processing time required for executing one or more batch jobs in optimization module. In the next step converting the obtained optimal solutions of the model to actionable levers using a reconfiguration module and it re-configures the batch job system's run to optimize processing time by updating the job and dependency tables.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
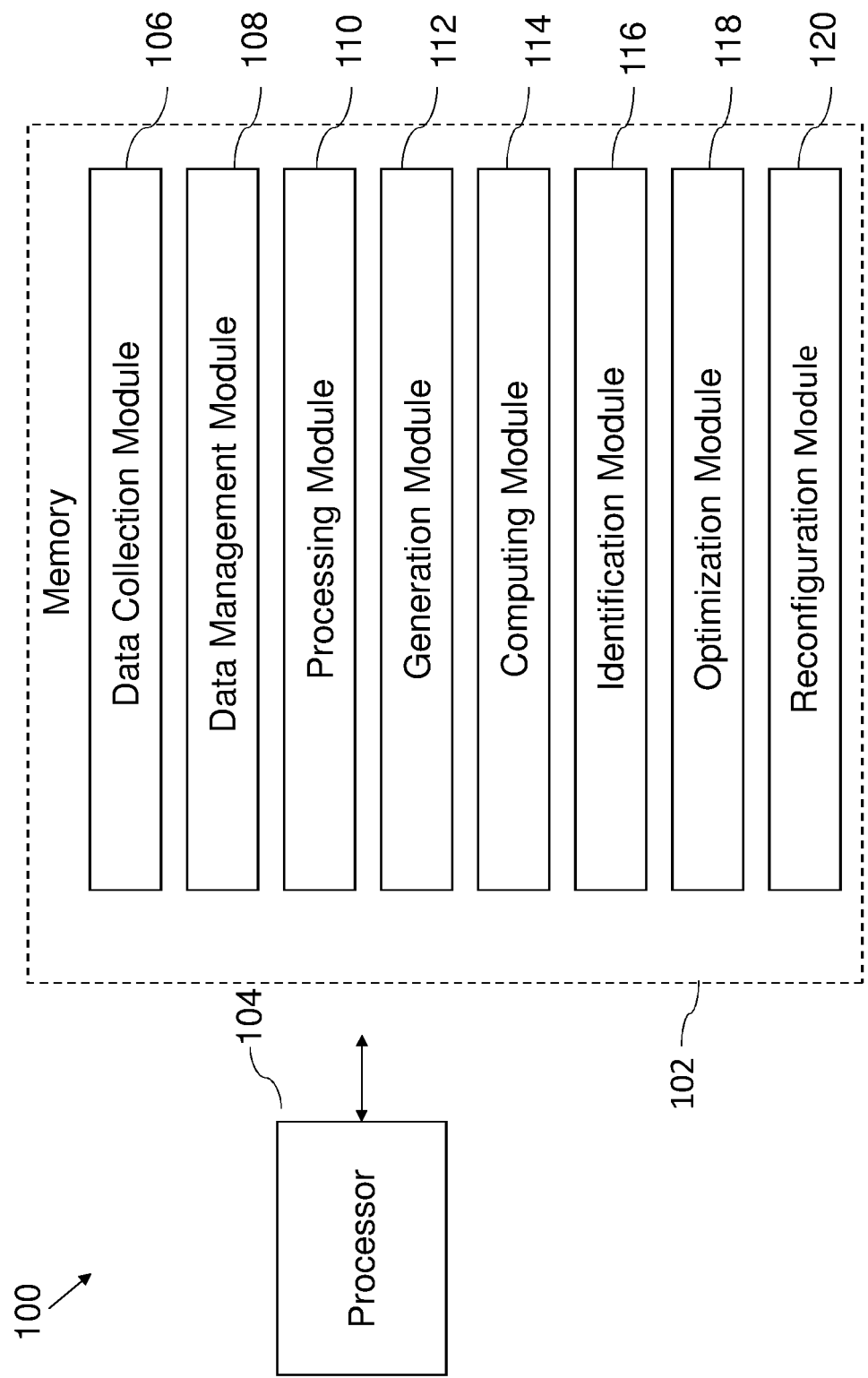
FIG. 1 is a block diagram showing a system for optimizing batch processing time required for executing one or more batch jobs received in real time according to an embodiment of the present disclosure.

Some embodiments of this disclosure, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described. In the following description for the purpose of explanation and understanding reference has been made to numerous embodiments for which the intent is not to limit the scope of the disclosure.

One or more components of the disclosure are described as module for the understanding of the specification. For example, a module may include self-contained component in a hardware circuit comprising of logical gate, semiconductor device, integrated circuits or any other discrete component. The module may also be a part of any software program executed by any hardware entity for example processor. The implementation of module as a software program may include a set of logical instructions to be executed by a processor or any other hardware entity.

The disclosed embodiments are merely exemplary of the disclosure, which may be embodied in various forms.

The elements illustrated in the figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

Method steps of the disclosure may be performed by one or more computer processors executing a program tangibly embodied on a computer-readable medium to perform functions of the disclosure by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk In view of the foregoing, an embodiment herein provides a system and a method for optimizing processing time required for executing one or more batch jobs received in real time.

Referring FIG. 1, a system (100) for optimizing processing time required for executing one or more batch jobs received in real time, while adhering to service level agreement (SLA) compliance in one batch job arrangement of an information technology service management (ITSM). The system (100) comprising a memory (102) and a processor (104) communicatively coupled with memory (102). Further, the system (100) comprises a data collection module (106), a data management module (108), processing module (110), generation module (112), a computing module (114), an identification module (116), an optimization module (118) and a reconfiguration module (120).

In the preferred embodiment of the disclosure, the data collection module (106) of the system (100) receives one or more data sets such as one or more jobs and each job dependencies data table, transactional history, batch schedule and SLA definitions from one or more sources. It would be appreciated that they are considered as one or more inputs to the system (100). The one or more job dependencies describe a graph that captures the dependency relationship among the one or more jobs. These relationship are defined by underlying business logic and cannot be changed arbitrarily. Run history data comprises of job start-time, end-time, from-time, and run-time. The start-time of the job is the time when the job execution starts while the end-time of the job is the time when the job execution ends. The from-time of each job is a constraint that restricts the start-time of the job and the run-time is the amount of time taken to complete the job execution. The run history data are very important for efficient and feasible scheduling the one or more jobs in the ITSM.

Further herein, one or more business constraints which are generally derived from the jobs relationships and requirements. A typical business constraint could be something like a job can start only after its defined from-time. Further, a job can start only after all its each predecessors has completed its execution, if the job or dependency among the one or more jobs is defined as constraint then it cannot be perturbed.

In the preferred embodiment of the disclosure, the data management module (108) of the system (100) filters the received data sets to ensure data consistency, completeness and uniformity. The one or more input to the system (100) may not be consistent and complete data sets, therefore they are required to filter down to ensure data consistency of the received input.

In the preferred embodiment of the disclosure, the processing module (110) configured to create a profile and predecessor list of each job using output of the data management module (108). The job profile of each job is a collection of characteristics of the job that are useful in scheduling of the job. Wherein, each job profile includes job name, run-time, from-time, and predefined SLAs. Further, the predecessor list of each job represents the dependencies among the one or more jobs. It would be appreciated that a job can start executing only when all of its predecessor jobs are executed. It captures relationship between one or more jobs.

In the preferred embodiment of the disclosure, the generation module (112) of the system (100) configured to generate a dependency graph of each job for one or more root-nodes detection using the created profile and predecessor list of each job. In the dependency graph each node represents a job and an edge represents the precedence relationship among the one or more jobs.

In the preferred embodiment of the disclosure, the computing module (114) of the system (100) configured to compute reach time of each job and based on the computed reach time of each job one or more violations are identified. The reach time is defined as the earliest time epoch a job can start execution. It represents in a metric form which helps in identifying the potential SLA non-compliant jobs by comparing reach time and predefined SLA definitions. In an example, for a job (j) the reach-time can be calculated as:

reach-time(j)=max{(reach-time(k)+run-time(k)),from-time(j)}∀Jobs(k)∈Predecessors(j)

wherein the reach-time (k) and run-time (k) is of a predecessor job (k).

In the preferred embodiment of the disclosure, the identification module (116) of the system (100) configured to identify a set of levers corresponding to each identified SLA violation using an integer linear programming technique and the output of data management module (108).

In the preferred embodiment of the disclosure, the optimization module (118) of the system (100) configured to select the one or more jobs corresponding to each violation to either postpone the selected one or more jobs to another batch or executing them partially for reducing batch processing time.

In the preferred embodiment of the disclosure, the reconfiguration module (120) of the system (100) to update the one or more jobs and dependency tables using the one or more identified levers to obtain an optimal solution of the system (100).

In the preferred embodiment of the disclosure, the reconfiguration module (120) converts the obtained optimal solutions of the model to actionable levers. Further, the reconfiguration module (120) identifies the one or more jobs that can be postponed to another batch and executes batch jobs partially by reducing the workload or running the job on multiple cores simultaneously. Furthermore, the reconfiguration module (120) identifies the dependencies that can be relaxed or identifies those jobs, whose from-time constraint can be relaxed. Once the system (100) identifies all levers, it re-configures the batch job system's run to optimize processing time by updating the job and dependency tables.

In an example, wherein a Python-PuLP integer linear program is being used to create an optimizer consumable input format (.lp file). There are so many solvers available to solve the ILP formulations and the present disclosure is not limited only to the Python-PuLP integer linear program. It would be noted that Python-PuLP integer linear program is being used only for illustration purpose. The created 0.1p file is passed to the optimization solver to obtain the optimal solution. A CBC solver is being used to obtain optimal solutions of the created 0.1p file. It is to be noted that the present disclosure is not limited to the CBC solver though it can use other proprietary solvers such as Cplex, Gurobi, etc. to obtain the optimal solutions.

Figure 2:
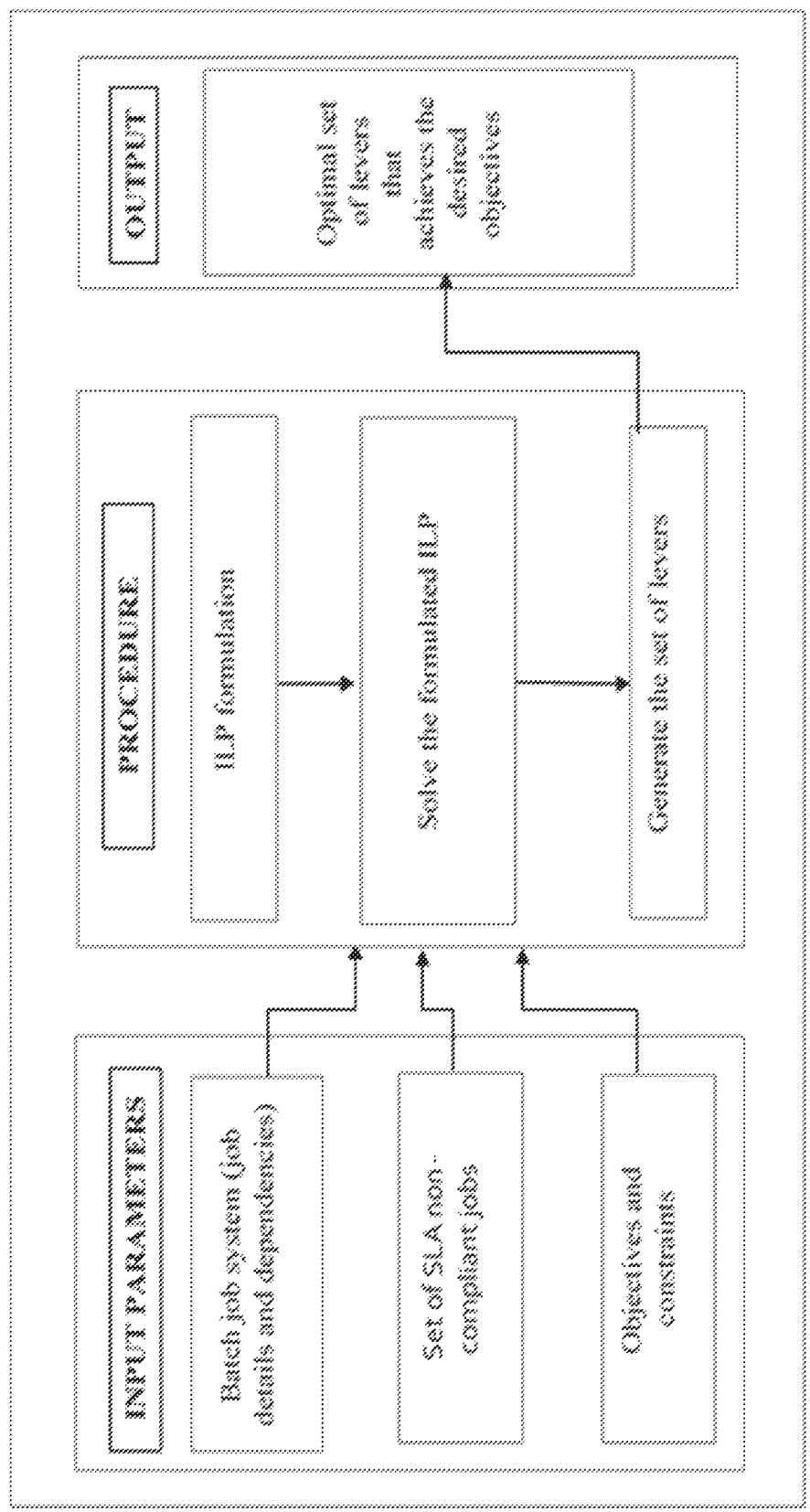
FIG. 2 is a schematic diagram showing optimizing batch processing using what-if engine according to an embodiment of the present disclosure.

In another embodiment, the system (100) is configured to minimize SLA non-compliances with minimal system perturbation. Therefore, the objective function defines two parts as to first part (BatchProcessingTime) takes care of the minimization of total batch processing time and second part (SystemPertubation) ensures minimum system pertubations as shown in FIG. 2.

$$\text{Minimize } ([BatchProcessingTime] + [SystemPertubation])$$

$$\text{Minimize } [maxRT] + \left[\sum_j -(x_j + \text{cnt\_pr}_j + rst_j)\right]$$

In the preferred embodiment of the disclosure, the function total batch processing time and maxRT captures the time when the last job of the batch completed execution. So, minimization of maxRT ensures that the model will minimize the total batch processing time of the batch.

In the preferred embodiment of the disclosure, the function (SystemPertubation) has four levers (delete a job ($x_j$), delete a dependency ($y_{jk}$), reduce run-time/workload ($pr_j$) and reuse from-time ($rst_j$) to achieve the objective. It is to be noted that the model uses these levers as minimum as possible and minimize the SLA non-compliances.

In yet another embodiment, the system (100) is configured to obtain optimal set of levers that minimizes SLA non-compliances and optimizes batch processing to minimize SLA non-compliances and to optimize batch processing time required for executing one or more batch jobs while considering following constraints.

Sacrosanct Constraints:

There are few business critical jobs or dependencies, which cannot be altered. Constraints 1 ensures that the system (100) cannot delete a business critical job from the current batch or reduce its workload or run-time. Constraint 2 puts bound on run-time reduction of a job. Constraint 3 ensures that no business critical dependencies are deleted.

$$pr_j=1, rst_j=0 \text{ and } x_j=1, \forall j \epsilon cj \text{ (critical jobs cannot be deleted)} \quad (1)$$

$$pr_j \leq x_j, \forall j \text{ (puts bound on 'run-time' reduction of a job)} \quad (2)$$

$$y_{jk}=1, \forall e(j,k) \epsilon cE \text{ (critical dependencies cannot be removed)} \quad (3)$$

Reach-Time Constraint:

The system defines reach-time (Reachtime$_j$) of a job j as the earliest time epoch, when the job j can be started executing. Constraint 4 ensures that the job j can start executing after its from-time only. Constraint 5 makes sure that the job j can start executing only after all its predecessor jobs are executed.

$$\text{Reachtime}_j + M^*(1-x_j) \geq ft_j - rst_j, \forall j \quad (4)$$

$$\text{Reachtime}_j + M^*(1-x_j) \geq rty_{jk} + (rt_k * ayp_{jk}), \forall j \text{ and } k \epsilon PL(j) \quad (5)$$

SLA Non-Compliant Identifier Constraints:

Constraints 6 and 7 ensures that when a job j violates end-time SLA (et$_j$), it is registered through the decision variable z$_j$. Similarly, constraints 8 and 9 ensures start-time SLA (st$_j$) violation is recorded in variable s$_j$.

$$et_j * z_j < \text{reachtime}_j + (rt_j * pr_j) + M^*(1-x_j), \forall j \quad (6)$$

$$\text{reachtime}_j + (rt_j * pr_j) - M^*(1-x_j) \leq et_j * (z_j+1) + M^* z_j, \forall j \quad (7)$$

$$st_j * s_j < \text{reachtime}_j + M^*(1-x_j), \forall j \quad (8)$$

$$\text{reachtime}_j - M^*(1-x_j) \leq st_j * (s_j+1) + M^* s_j, \forall j \quad (9)$$

Auxiliary Constraints:

These constraints helps in establishing the relationships between different variables. Constraint 10 records if run-time reduction is required for job j. Further, the constraints (11)-(13) are the equivalent of the non-linear constraint, $$cnt\_pr_j \geq 1 - pr_j, \forall j \quad (10)$$

$$ayp_{jk} = y_{jk} * pr_k \quad (11)$$

$$ayp_{jk} \leq pr_k + M^*(1-y_{jk}), \forall j, k \epsilon PL(j) \quad (12)$$

$$(1-y_{jk})^* M + ayp_{jk} \geq pr_k, \forall j, k \epsilon PL(j) - y_{jk} * M + ayp_{jk} \leq 0, \forall j, k \epsilon PL(j) \quad (13)$$

Wherein, the variable ayp$_{jk}$ captures the run-time reduction for job j if dependency between job j and k are not deleted. This value is required for reach-time calculation. Similarly, constraints (14)-(16) are the equivalent of the non-linear constraint.

$$rty_{jk} = y_{jk} * \text{reachtime}_k \quad (14)$$

$$rty_{jk} \leq \text{reachtime}_k + M^*(1-y_{jk}), \forall j, k \epsilon PL(j) \quad (15)$$

$$(1-y_{jk})^* M + rty_{jk} \geq \text{reachtime}_k, \forall j, k \epsilon PL(j) - y_{jk} * M + rty_{jk} \leq 0, \forall j, k \epsilon PL(j) \quad (16)$$

Furthermore, the constraints (17)-(19) are equivalent of the non-linear constraint, $axz_j = x_j$ $$axz_j \geq x_j + z_j - 1, \forall j \quad (17)$$

$$axz_j \leq x_j, \forall j \quad (18)$$

$$axz_j \leq z_j, \forall j \quad (19)$$

Therefore, the obtained optimal solutions in the mathematical terms are translated into implementable actions such as either identifying the jobs that can be postponed to another batch or executing one or more jobs partially by reducing the workload or identifying the dependency of one or more jobs running on multiple cores simultaneously and that dependency can be relaxed or identifying one or more jobs whose from-time constraint can be relaxed.

Figure 3:
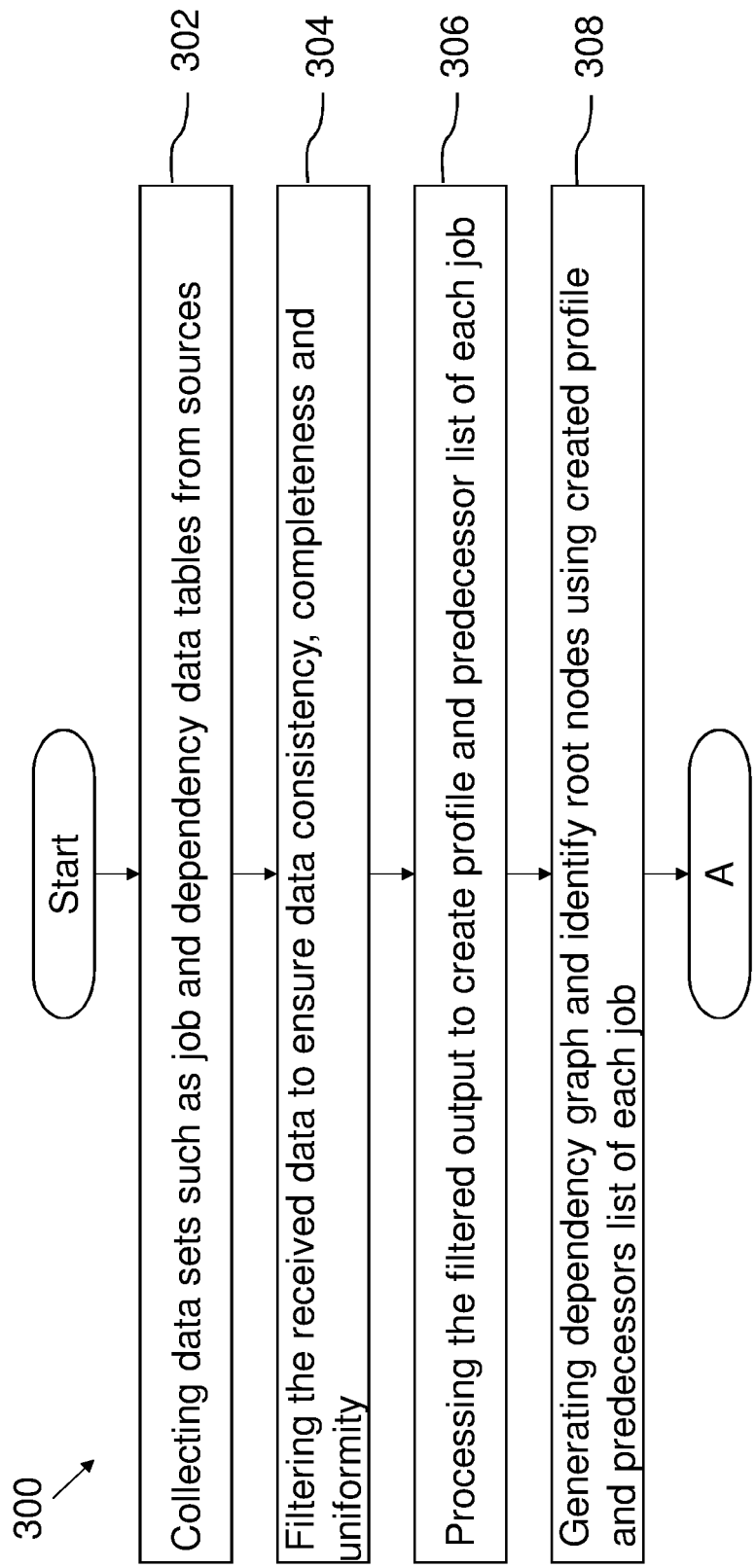
FIGS. 3(a) & 3(b) illustrates a flow diagram showing a method for optimizing batch processing time required for executing one or more batch jobs received in real time according to an embodiment of the present disclosure.
Figure 3:
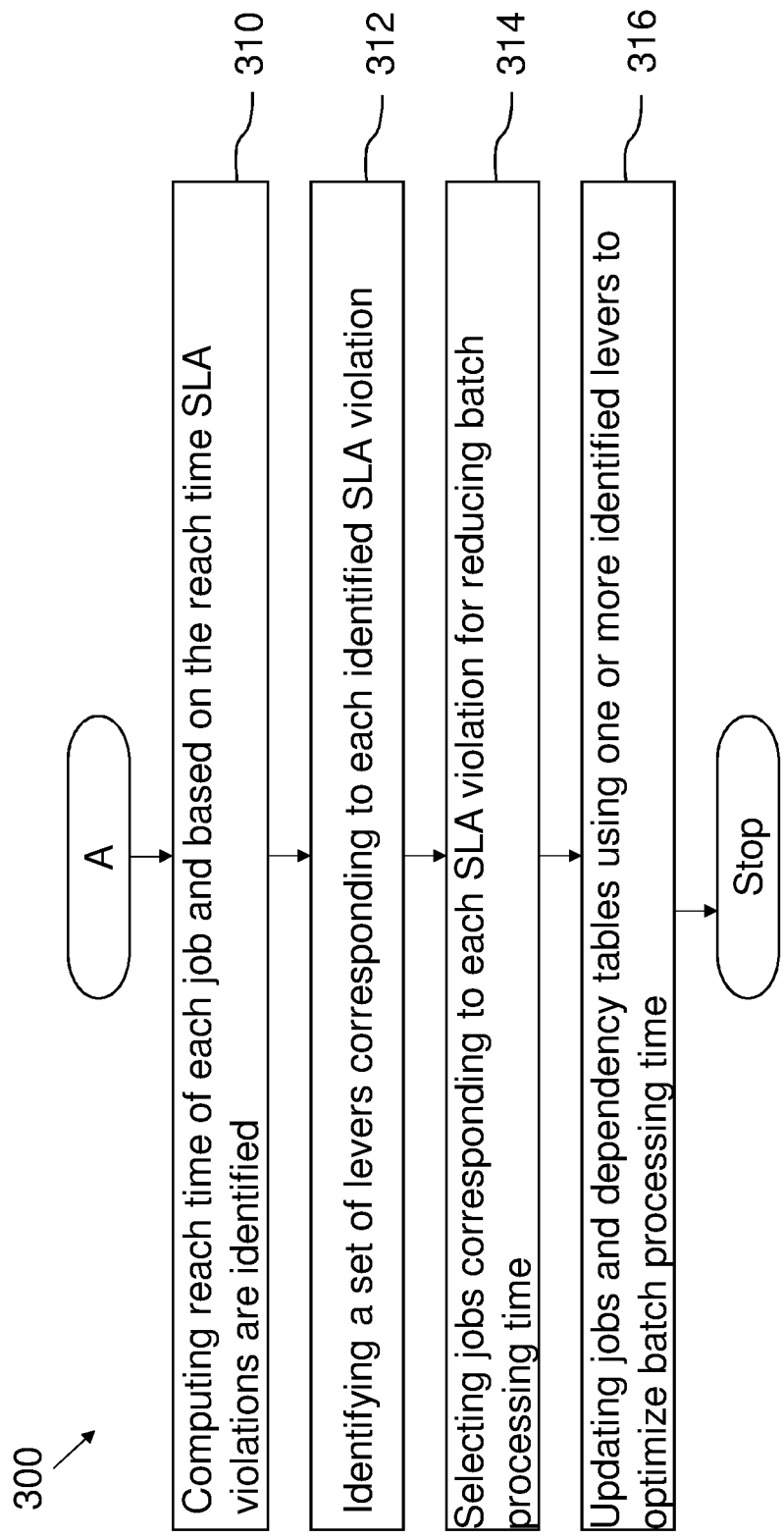

Referring FIGS. 3(a) & 3(b), a method (300) for optimizing processing time required for executing one or more batch jobs received in real time, while adhering to service level agreement (SLA) compliance in one batch job arrangement of an information technology service management (ITSM).

In the preferred embodiment of the disclosure, at the step (302) one or more data sets such as one or more jobs and each job dependencies data table, transactional history, batch schedule and SLA definitions from one or more sources are collected at a data collection module (106) of the system (100). The one or more job dependencies describe a graph that captures the dependency relationship among the one or more jobs. These relationship are defined by underlying business logic and cannot be changed arbitrarily. Run history data comprises of job start-time, end-time, from-time, and run-time. The start-time of the job is the time when the job execution starts while the end-time of the job is the time when the job execution ends. The from-time of each job is a constraint that restricts the start-time of the job and the run-time is the amount of time taken to complete the job execution. The run history data are very important for efficient and feasible scheduling the one or more jobs in the ITSM.

In the preferred embodiment of the disclosure, at the step (304), the collected data sets are filtered using a data management module (108) of the system (100) to ensure data consistency, completeness and uniformity. It is to be noted that the one or more input to the system may not be consistent and complete data sets, therefore they are required to be filtered to ensure data consistency of the received inputs.

In the preferred embodiment of the disclosure, at the step (306), creating a profile and predecessor list of each job at a processing module (110) using the filtered input to the system (100). The job profile of each job is a collection of characteristics of the job that are useful in scheduling of the job. Wherein, each job profile includes job name, run time, from time, criticality and predefined SLAs. Further, the predecessor list of each job represents the dependencies among the one or more jobs. It would be appreciated that a job can start executing if all of its predecessor jobs are executed. It captures relationship between one or more jobs.

In the preferred embodiment of the disclosure, at the step (308), generating a dependency graph of each job at a generation module (112) of the system (100) for one or more root-nodes detection using the created profile and predecessor list of each job. In the dependency graph each node represents a job and an edge represents the precedence relationship among the one or more jobs.

In the preferred embodiment of the disclosure, at the step (310), computing reach time of each job at a computing module (114) of the system (100) and based on the computed reach time of each job one or more violations are identified. The reach time is defined as the earliest time epoch a job can start execution. It represents in a metric form which helps in identifying the potential SLA non-compliant jobs by comparing reach time and predefined SLA definitions. In an example, for a job (j) the reach-time can be calculated as:

$$\text{reach-time}(j)=\max\{(\text{reach-time}(k)+\text{run-time}(k)),\text{from-time}(j)\} \forall \text{Jobs}(k) \in \text{Predecessors}(j);$$

wherein the reach-time (k) and run-time (k) is of a predecessor job (k).

In the preferred embodiment of the disclosure, at the step (312), identifying a set of levers at an identification module (116) of the system (100) corresponding to each identified SLA violation using an integer linear programming technique and the output of data management module (108).

In the preferred embodiment of the disclosure, at the step (314), selecting the one or more jobs corresponding to each violation to either postpone the selected one or more jobs to another batch or executing them partially for reducing batch processing time using an optimization module (118) of the system (100).

In the preferred embodiment of the disclosure at the last step (316), updating the one or more jobs and dependency tables using one or more identified levers to obtain an optimal solution using a reconfiguration module (120) of the system (100). Further, it converts the obtained optimal solutions of the model into actionable levers. Further, it identifies the one or more jobs that can be postponed to another batch and executes batch jobs partially by reducing the workload or running the job on multiple cores simultaneously. In addition to this, it identifies the dependencies that can be relaxed or identifies those jobs, whose from-time constraint can be relaxed. Once the system (100) identifies all levers, it re-configures the batch job system's run to optimize processing time by updating the job and dependency tables.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiment, thus provides the system and method for securely executing a transaction request using a communication channel.

The embodiments herein provide a system and method for optimizing batch processing time required for executing one or more batch jobs received in real time, while adhering to service level agreements (SLAs) compliance in one batch job arrangement of an information technology service management (ITSM). A batch job system is characterized by the set of jobs and dependencies between jobs. Each job is in turn characterized by run-time, from-time and SLA definitions. SLAs can be of two kinds Start-time and End-time. Start-time SLA requires that the job execution starts before the specified time while End-time SLA necessitates that the job finishes its execution before the specified time. To optimize processing time required for executing one or more batch jobs the disclosure identifies SLA violations and solves them to produce a set of actionable levers.

It is, however to be understood that the scope of the protection is extended to such a program and in addition to a computer-readable means having a message therein, such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example. The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A system for reducing a batch processing time while adhering to service level agreement (SLA) compliance in one batch job arrangement of an information technology service management (ITSM), wherein the system comprising:
   at least one memory with a plurality of instructions;
   at least one processor, wherein the at least one processor is communicatively coupled with the at least one memory;
   a data collection module configured to receive:
      one or more constraints of a business, a run history data and one or more SLA definitions of each job of the business, and
      one or more inputs from a user as one or more inputs to the system;
   a data management module configured to filter the received one or more inputs to the system to ensure consistency between subsequent job data tables and dependency data tables;
   a processing module configured to create a profile and predecessor list of each job using output of the data management module;
   a generation module configured to generate a dependency graph of each job for one or more root-nodes detection using the created profile and predecessor list of each job;
   a computing module configured to compute reach-time of each job and based on the computed reach time of each job one or more violations are identified;
   an identification module configured to identify a set of levers corresponding to each identified SLA violation using an integer linear programming technique and the output of data management module; and
   an optimization module configured to select the one or more jobs corresponding to each SLA violation to either postpone the selected one or more jobs to another batch or executing them partially for reducing the batch processing time.

2. The system of claim 1, further comprising:
   a reconfiguration module to update the one or more jobs and dependency data tables using one or more identified levers to optimize the batch processing time.

3. The system of claim 1, wherein the set of levers corresponding to each violation comprising a definite time by which the job may be preponed, and a fraction of run time of the job may be reduced.

4. The system of claim 1, wherein the one or more constraints comprising a precedence order of the one or more jobs of the predefined business and from-time of each job.

5. The system of claim 1, wherein the run history data of each job comprising start-time, end-time, from-time, and run-time of each job.

6. The system of claim 1, wherein the list of predecessors of each job represents the dependencies among the jobs of the ITSM.

7. A method for reducing batch processing time while adhering to service level agreements (SLA) compliance in one batch job arrangement of information technology service management (ITSM), wherein the method comprising:
   collecting, at a data collection module, one or more constraints of a predefined business, a run history data and one or more SLA definitions of each job and one or more inputs from a user as one or more inputs to the system;
   filtering, at a data management module, the received one or more inputs to ensure data measures, consistency between subsequent job data tables and dependency data tables;
   processing, at a processing module, the filtered output of data management module to create a profile and predecessor list of each job;
   generating, at a generation module, a dependency graph of each job for one or more root-nodes detection using the created profile and predecessor list of each job;
   computing reach time of each job using a computing module and based on the computed reach time of each job one or more SLA violations are identified; and
   identifying, at an identification module, a set of levers corresponding to each identified SLA violation using an integer linear programming technique and the output of data management module; and
   selecting, at an optimization module, one or more jobs corresponding to each SLA violation to either postpone the selected one or more jobs to another batch or executing them partially for reducing batch processing time.

8. The method of claim 7, further comprising:
   updating, at a reconfiguration module, the one or more jobs and dependency tables using one or more identified levers to optimize batch processing time.

9. The method of claim 7, wherein the set of generated levers corresponding to each violation comprising a definite time by which the job may be preponed, and a fraction of run time of the job may be reduced.

10. The method of claim 7, wherein the run history data of each job comprising start-time, end-time, from-time, and run-time of each job.

11. The method of claim 7, wherein the list of predecessors of each job represents the dependencies among the one or more jobs of the ITSM.

* * * * *